United States Patent
Chen et al.

(10) Patent No.: US 12,308,468 B2
(45) Date of Patent: May 20, 2025

(54) CELL SEPARATOR FLY-CUT MECHANISM

(71) Applicant: SHENZHEN GEESUN INTELLIGENT TECHNOLOGY CO., LTD., Guangdong (CN)

(72) Inventors: Fei Chen, Guangdong (CN); Lingcong Li, Guangdong (CN); Junmo Zou, Guangdong (CN); Rukun Yang, Guangdong (CN); Ji Yang, Guangdong (CN); Xueke Wu, Guangdong (CN)

(73) Assignee: SHENZHEN GEESUN INTELLIGENT TECHNOLOGY CO., LTD., Guangdong (CN)

( * ) Notice: Subject to any disclaimer, the term of this patent is extended or adjusted under 35 U.S.C. 154(b) by 647 days.

(21) Appl. No.: 17/741,601

(22) Filed: May 11, 2022

(65) Prior Publication Data

US 2023/0238648 A1   Jul. 27, 2023

(30) Foreign Application Priority Data

Jan. 27, 2022   (CN) .......................... 202210099426.1

(51) Int. Cl.
*H01M 50/406* (2021.01)
*B23C 3/00* (2006.01)
*B23C 3/12* (2006.01)

(52) U.S. Cl.
CPC .......... *H01M 50/406* (2021.01); *B23C 3/002* (2013.01); *B23C 3/12* (2013.01)

(58) Field of Classification Search
CPC ......... H01M 10/0404; H01M 10/0409; H01M 10/052; H01M 10/0587; H01M 50/406; B23C 3/002; B23C 3/12; B65H 2301/515323; B65H 19/26; B65H 2801/72; Y02E 60/10; Y02P 70/50
See application file for complete search history.

(56) References Cited

U.S. PATENT DOCUMENTS

2022/0123349 A1 *   4/2022  Li .................... H01M 10/0431

* cited by examiner

*Primary Examiner* — Robert G Bachner
(74) *Attorney, Agent, or Firm* — IP & T GROUP LLP

(57) ABSTRACT

A cell separator fly-cut mechanism includes a first driving component, a second driving component, a lamination component and a fly-cut component, and the lamination component is in transmission connection with the first driving component; and the fly-cut component is in transmission connection with the second driving component, and the fly-cut component is used to move synchronously with the separator and cut off the separator at the same speed as the separator.

3 Claims, 3 Drawing Sheets

CELL SEPARATOR FLY-CUT MECHANISM

CROSS-REFERENCE TO RELATED APPLICATION

The present disclosure claims priority to Chinese patent application with the filing number 202210099426.1 filed on Jan. 27, 2022 with the Chinese Patent Office, and entitled "Cell Separator Fly-cut Mechanism", the contents of which are incorporated herein by reference in entirety.

TECHNICAL FIELD

The present application relates to the technical field of battery manufacturing, in particular, to a cell separator fly-cut mechanism.

BACKGROUND ART

At present, in the power lithium battery production process, usually the winding machine is used to wind the positive and negative electrodes (cathode and anode) and the separator to form the cell (battery cell). After winding one cell, it is necessary to change the station to wind the next cell and at this time, the tail separator of the previous cell needs to be cut off, so that the former cell is finished and the winding for latter cell starts. At present, when being cut off, the separator needs to be in a stationary state, and the winding needle is also in a stationary state, and then the action of cutting off the separator is performed. However, with the increase of the winding speed of the cell, the cutting of the separator in the stationary state can no longer meet the requirement on the production efficiency of equipment, and thus it is desired to modify the method of cutting the separator to shorten the production cycle of cells.

SUMMARY

The objects of the present application comprise, for example, providing a cell/jellyroll separator fly-cut mechanism, which is compact in structure, stable in the cutting, and capable of cutting off the separator without stopping the separator, so as to realize the fly-cut function, and quickly cut off the separator, reducing the time of cutting the separator, greatly improving the production efficiency of cells (jellyrolls), and improves the production capacity of products.

Embodiments of the present application can be implemented as follows.

On the first aspect, the present application provides a cell separator fly-cut mechanism, comprising a first driving component, a second driving component, a lamination component (separator pressing component) and a fly-cut component, wherein the lamination component is in transmission connection with the first driving component and can perform linear reciprocating motion along a preset direction under driving of the first driving component to move close to or away from a winding needle, the lamination component is configured for rolling and pressing the separator on the winding needle; the fly-cut component is in transmission connection with the second driving component and can perform linear reciprocating motion along the preset direction under driving of the second driving component to move close to or away from the separator, and the fly-cut component comprises a fly-cut connecting frame, a rotary driving component, a rotary shaft and a cutter, the fly-cut connecting frame is in transmission connection with the second driving component, the rotary driving component is arranged on the fly-cut connecting frame, and the rotary shaft is rotatably arranged on the fly-cut connecting frame and is in transmission connection with the rotary driving component for rotating relatively to the fly-cut connecting frame under driving of the rotary driving component; the cutter is arranged at a surface of the rotary shaft, the cutter, when being close to the separator, clings to a surface of the winding needle, and at the same time, the separator rotates along with the winding needle, and the cutter is configured for moving in synchronization with the separator under driving of the rotary shaft and cutting off the separator at the speed same as that of the separator.

In the optional embodiment, the lamination component comprises a lamination driving component, a lamination mounting frame and a lamination roller, the lamination mounting frame is in transmission connection to the first driving component, the lamination driving component is arranged on the lamination mounting frame, the lamination roller is rotatably arranged on the lamination mounting frame, the lamination mounting frame is configured to perform linear reciprocating motion under driving of the lamination driving component so as to make the lamination roller move close to or away from the winding needle, and the lamination roller is configured for pressing the separator on the winding needle.

In the optional embodiment, the lamination mounting frame comprises a bearing bracket and a mounting frame, the bearing bracket is connected with the lamination driving component, the mounting frame is arranged on a side of the bearing bracket away from the lamination driving component, the lamination roller is rotatably arranged on the mounting frame, the bearing bracket is also provided with an adjustment member, and the adjustment member is used for a relative angle between the mounting frame and the bearing bracket, such that an axis of the lamination roller is parallel to an axis of the winding needle.

The beneficial effects of the embodiments of the present application comprise, for example, the following.

To sum up, in the cell separator fly-cut mechanism provided by the embodiment of the present application, the lamination component is in transmission connection with the first driving component and can perform linear reciprocating motion along a preset direction under the driving of the first driving component, so as to move close to or away from the winding needle, the lamination component is configured to roll and press the separator on the winding needle; the fly-cut component is in transmission connection with the second driving component and can perform linear reciprocating motion along the preset direction under driving of the second driving component, so as to move close to or away from the separator, the fly-cut component is configured to move synchronously with the separator and cut off the separator at the speed same as that of the separator. Compared with the prior art, the present application uses the lamination component to press the separator, so that no vibration occurs when the separator is cut, and the cutting stability is good, and the fly-cut component cuts the separator at the same speed as the separator, so that the separator can be cut off without stopping the separator, so as to realize the fly-cut function. The separator is cut off quickly, and the time for cutting the separator is reduced, which greatly improves the production efficiency of cells and improves the production capacity of products.

BRIEF DESCRIPTION OF DRAWINGS

In order to illustrate the technical solutions of the embodiments of the present application more clearly, the drawings required in the embodiments will be briefly introduced below. It should be understood that the following drawings only show some embodiments of the present application, and therefore should not be regarded as a limitation to the scope. For those skilled in the art, other related drawings can also be obtained according to these drawings without any creative efforts.

Figure 1:
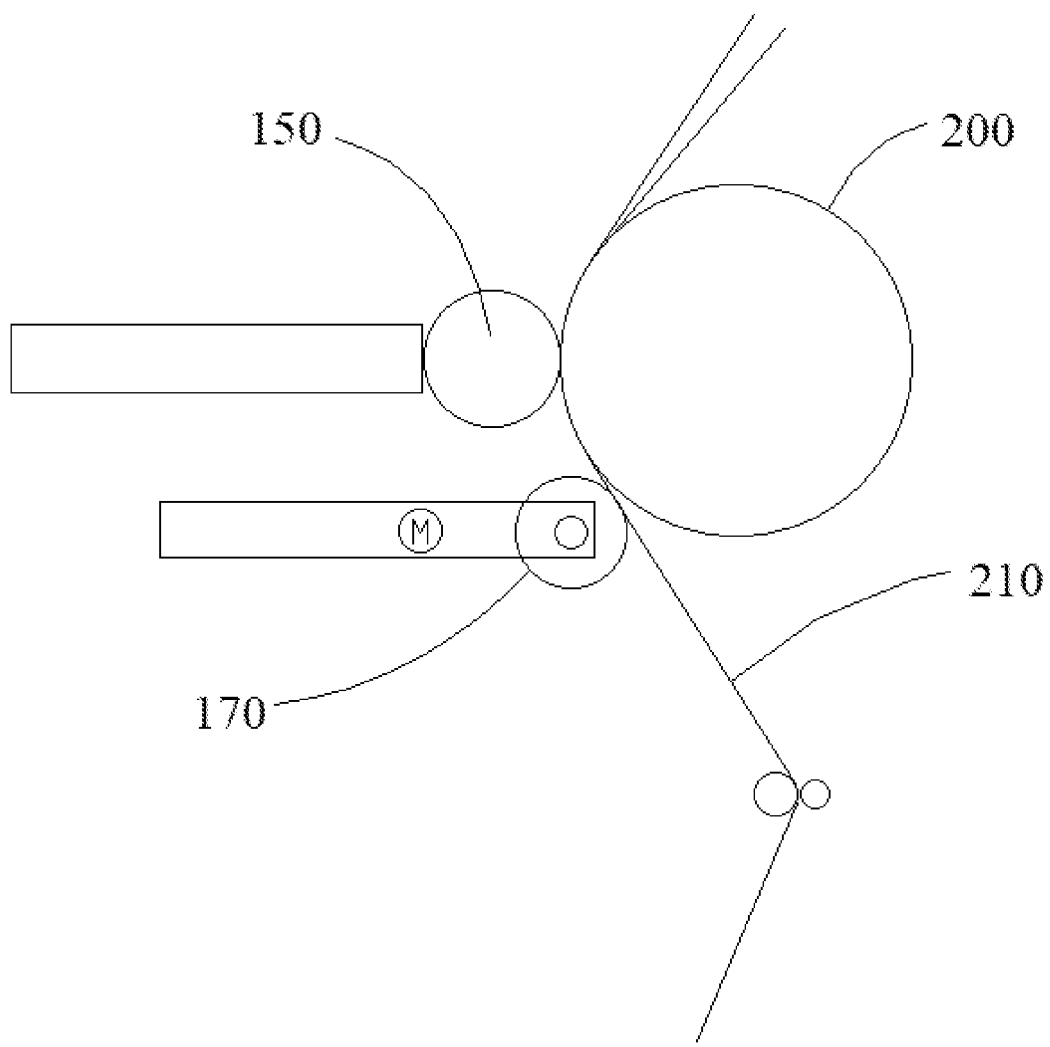
FIG. 1 is a structural schematic diagram of a cell separator fly-cut mechanism provided by an embodiment of the present application.

Reference Number: 100—cell separator fly-cut mechanism; 150—lamination component; 152—lamination driving component; 154—lamination roller; 170—fly-cut component; 171—fly-cut connecting frame; 172—rotation driving component; 174—cutter; 200—winding needle; and 210—separator.

DETAILED DESCRIPTION OF EMBODIMENTS

In order to make the purposes, technical solutions and advantages of the embodiments of the present application clearer, the technical solutions in the embodiments of the present application will be clearly and completely described below with reference to the drawings in the embodiments of the present application. Obviously, the described embodiments are some of embodiments of the present application, but not all embodiments. Generally, the components of the embodiments of the present application described and illustrated in the drawings herein may be arranged and designed in a variety of different configurations.

Thus, the following detailed description of the embodiments of the present application provided in the drawings is not intended to limit the protection scope of the present application, but is merely representative of selected embodiments of the present application. Based on the embodiments of the present application, all other embodiments, which are obtained by those skilled in the art without creative efforts, shall fall within the protection scope of the present application.

It should be noted that similar numerals and letters refer to similar items in the following figures, and thus once an item is defined in one figure, it is not required to further define and explain it in subsequent figures.

In the description of the present application, it should be noted that, if the terms, "upper", "lower", "inner", "outer", etc., are presented, the orientation or positional relationship indicated is based on the orientation or positional relationship shown in the drawings, or the orientation or positional relationship that the product of the present application is usually placed in use, only for the convenience of describing the present application and simplifying the description, rather than indicating or implying that the device or element referred to must be in the specific orientation, or be constructed and operated in a specific orientation, and therefore it should not be construed as a limitation to the present application.

In addition, if the terms, "first", "second" and the like, are presented, they are only used to describe the distinguishing, and should not be construed as indicating or implying importance in the relativity.

It should be noted that the features in the embodiments of the present application may be combined with each other, if no conflict.

Embodiments

Referring to FIG. 1, the present embodiment provides a cell separator fly-cut mechanism 100, with good cutting stability, and it can cut off the separator 210 without stopping the separator 210, so as to realize the fly-cut function and quickly cut off the separator 210, reducing the cutting-off time of the separator 210, greatly improving the production efficiency of cells, and increasing the production capacity of products.

The cell separator fly-cut mechanism 100 provided in this embodiment comprises a first driving component, a second driving component, a lamination component 150 and a fly-cut component 170. The lamination component 150 is in transmission connection to the first driving component and can perform linear reciprocating motion along a preset direction under driving of the first driving component, to move close to or away from the winding needle 200. The lamination component 150 is used for rolling and pressing the separator 210 on the winding needle 200. The fly-cut member 170 is in transmission connection with the second driving component, and can perform linear reciprocating motion along a preset direction under the driving of the second driving component to move close to or away from the separator 210. The fly-cut component 170 is used to move synchronously with the separator 210, and cut off the separator 210 under the condition that the speed is the same as that of the separator 210.

In this embodiment, the cell separator fly-cut mechanism 100 is suitable for a winding machine. It is installed on the mounting plate of the winding machine, similarly with other components of the winding machine. The mounting plate is also provided with a winding needle 200. The membrane 210 or a composite material tape is wound on the winding needle 200. Specifically, the first driving component is fixedly arranged on the mounting plate and disposed as close to the winding needle 200. When the separator 210 is being cut, the first driving component and the second driving component are respectively used to drive the lamination component 150 and the fly-cut member 170 to move in a straight line and gradually approach the winding needle 200. At this time, the fly-cut component 170 is in a moving state. The fly-cut member 170 has a cutting point which is in contact with the separator 210. In the case that the linear speed of the moving at the cutting point is the same as the moving speed of the separator 210, the fly-cut component 170 cuts off the separator 210. Since the lamination component 150 is pressed against the winding needle 200 at this time, the separator 210 is supported and clamped to a certain extent without shaking, which greatly improves the cutting stability. The cell separator fly-cut mechanism 100 provided in this embodiment can realize that the separator 210 is cut off in the situation that the separator 210 is not stopped, so as to realize the fly-cut function. The separator 210 is cut off quickly, reducing the cutting time of the separator 210, and greatly improving the production efficiency of cells, and increasing the production capacity of products.

In addition, in this embodiment, the stroke of the first driving component to drive the lamination component 150 and the stroke of the second driving component to drive the fly-cut component 170 can be determined according to the thickness of the separator 210 and the winding conditions, and they have good adaptability and can be used for cutting separators 210 with different thicknesses and different winding directions.

In this embodiment, other rollers are also provided on the mounting plate to support the separator 210. Specifically, the winding needle 200 is located on the right side of the first driving component, and the separator 210 moves downward from the left side of the winding needle 200 to the other rollers. Of course, this is only an example for the purpose of explanation, and does not limit the movement directions of the winding needle 200 and the separator 210. Here, it is only necessary to ensure that the first driving component is arranged close to the separator 210, and that the lamination component 150 can be driven by the first driving component to move close to the separator 210 which is located on the discharge side of the winding needle 200.

Figure 2:
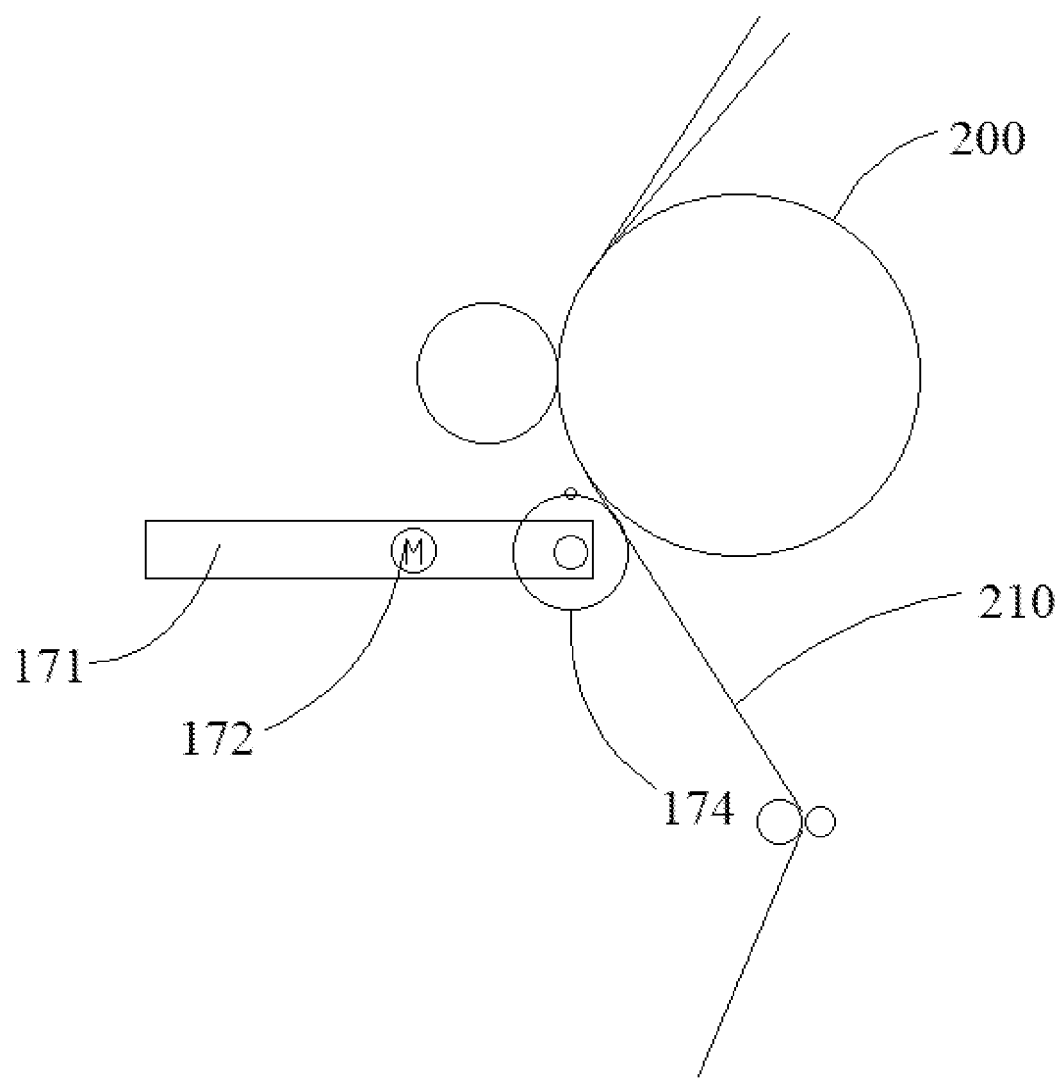
FIG. 2 is a structural schematic diagram of the fly-cut component in FIG. 1.

Referring to FIG. 2, the fly-cut component 170 comprises a fly-cut connecting frame 171, a rotary driving component 172, a rotary shaft and a cutter 174. The fly-cut connecting frame 171 is in transmission connection with the second driving component, and the rotating driving component 172 is arranged on the fly-cut connecting frame 171. The rotary shaft is rotatably arranged on the fly-cut connecting frame 171 and is in transmission connection with the rotary driving component 172 for rotating relatively to the fly-cut connecting frame 171 under the driving of the rotating driving component. The cutter 174 is arranged on the surface of the rotary shaft, for moving synchronously with the separator 210 under driving of the rotary shaft, and for cutting off the separator 210 at the speed same as that of the separator 210.

In this embodiment, the fly-cut connecting frame 171 is connected to the second driving component through detachable connecting members, such as bolts, etc., and can perform linear reciprocating motion under driving of the second driving component, thereby driving the rotary driving component 172, the rotary shaft and the cutter 174 to perform the linear reciprocating motion, realizing the displacement of the cutter 174.

It should be noted that, in this embodiment, the winding needle 200 is arranged on the right side of the first driving component, the rotary shaft is installed in a direction perpendicular to the mounting plate, and the axis direction of the rotary shaft is parallel to the axial direction of the winding needle 200.

In this embodiment, the fly-cut connecting frame 171 comprises a roller frame part and a bearing part which are integrally arranged. One end of the roller frame part is connected with the second driving component, and the bearing part is arranged at the other end of the roller frame part. The rotatory driving component 172, which is the rotary motor, is arranged on the bearing part. One end of the rotary shaft is connected with one end of the roller frame part close to the second driving component, and the other end thereof is connected with the bearing part and passes through and extends out from the bearing part, and both ends of the rotary shaft can rotate through bearings. A transmission belt is sleeved on the output shaft of the rotary motor, and the transmission belt is connected with the part of the rotary shaft extending out from the bearing part. The output shaft of the rotary motor is in transmission connection with the rotary shaft through the transmission belt, to realize the power transmission. Under driving of the rotary motor, the rotary shaft is driven to rotate at a high speed through the transmission belt.

In this embodiment, the cutter 174 comprises a heating wire and a spring member. The heating wire is arranged on the surface of the rotary shaft along the extending direction of the rotary shaft. Both ends of the heating wire are connected to a power source to supply the power to the heating wire. The heating wire is used to cut off the separator 210 by means of heat cutting. The spring member is arranged at one end of the heating wire, and provides the tensile elasticity to the heating wire, so as to keep the heating wire in a straightened state. Specifically, the cutter 174 cuts off the separator 210 by means of heat cutting, wherein the heating wire may be a resistive heating wire, which generates a high temperature after being energized, and can fuse the separator 210 in contact with it. In addition, the heating wire is connected to the external power supply here to realize the power supply.

In this embodiment, the spring member is a compression spring. By providing the spring member, the heating wire can always be subjected to the elastic force of the spring, so as to prevent the heating wire from loosening due to the thermal deformation, resulting in poor cutting effect.

It should be noted that in this embodiment, the extension direction of the heating wire is parallel to the axis of the rotary shaft, so that the movement trajectory of the heating wire is in a cylindrical shape, wherein the length of the heating wire can be greater than or equal to the width of the separator 210, so that the heating wire can cut off the separator 210 completely. Here, parameters, such as heating power and heating time, etc., of the heating wire can be controlled, so that it can cut off the separator 210 with different thicknesses and at different speeds.

It is worth noting that, in this embodiment, the rotary shaft is driven by the rotary driving component 172 to rotate, thereby driving the heating wire to perform a circular motion. Here, the rotating driving component 172 can ensure, through controlling the parameters, that the heating wire and the separator 210 are at the same speed when they are in contact with each other. Here, the speeds of the heating wire and the separator 210 are the same, which means that the linear speed of the heating wire is the same as the feeding speed of the separator 210. The two remain relatively stationary when they are in contact, thereby ensuring the cutting effect.

In other preferred embodiments of the present application, the cutter 174 can also use a conventional cold cutting process, that is, a cutting edge, to directly cut off the separator 210. As for the cold cutting process, the existing cutting process may be referred to, and it is not introduced more here.

Figure 3:
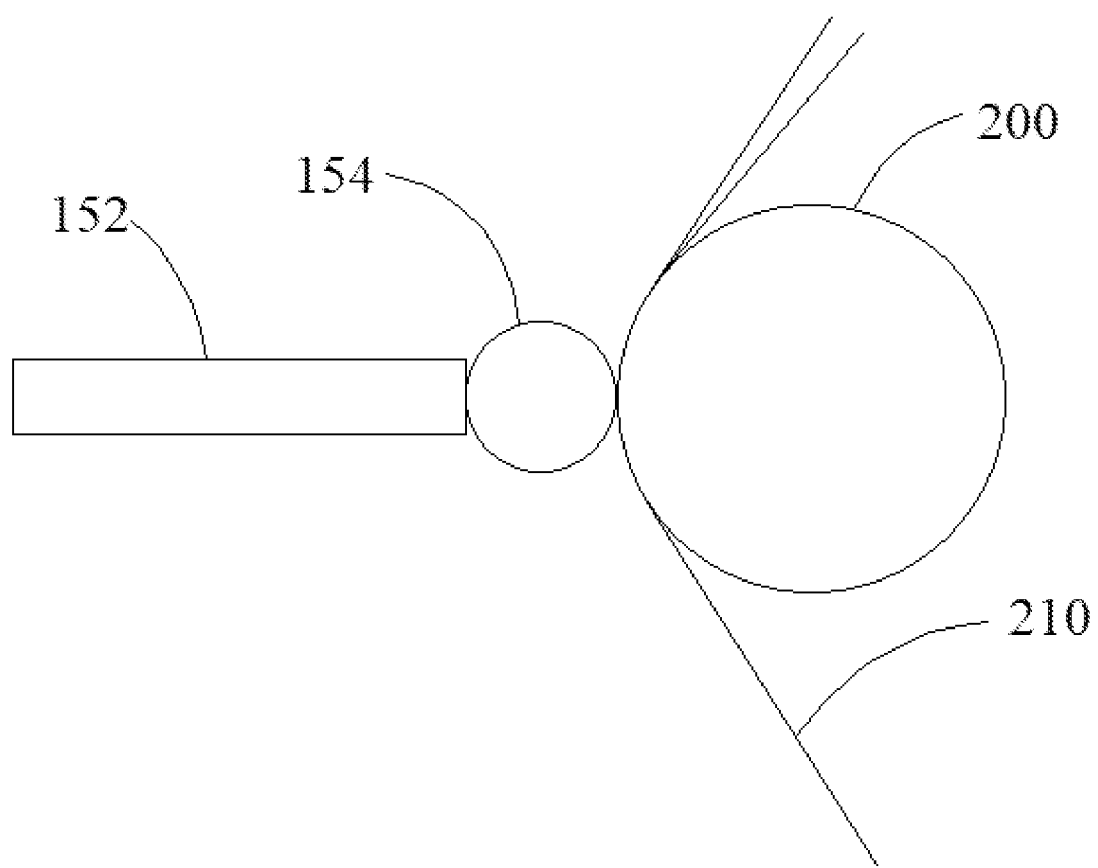
FIG. 3 is a structural schematic diagram of the lamination component in FIG. 1.

Referring to FIG. 3, the lamination component 150 comprises a lamination driving component 152, a lamination mounting frame and a lamination roller 154. The lamination mounting frame is in transmission connection with the first driving component, and the lamination driving component 152 is arranged on the lamination mounting frame. The lamination roller 154 is rotatably arranged on the lamination mounting frame, and the lamination mounting frame is used for performing the linear reciprocating motion under driving of the lamination driving component 152, so that the lamination roller 154 moves close to or away from the winding needle 200. The lamination roller 154 is used to press the membrane 210 on the winding needle 200. Specifically, the lamination driving component 152 is used to drive the lamination mounting frame to reciprocate in a straight line, thereby driving the lamination roller 154 to be pressed against the separator 210 or to move away from the separator 210.

In this embodiment, the lamination mounting frame is connected to the first driving component through bolts and other connecting parts, etc., so as to move in a straight line under the driving of the first driving component, thereby driving the lamination driving component 152, the lamination mounting frame and the lamination roller 154 to move together, and finally the lamination roller 154 is pressed against the separator 210 to realize the lamination.

In this embodiment, the lamination mounting frame comprises a bearing bracket and a mounting frame, the bearing bracket is connected to the lamination driving component 152, the mounting frame is arranged on the side of the bearing bracket away from the lamination driving component 152, and the lamination roller 154 is rotatably arranged on the mounting frame. The bearing bracket is also provided with an adjustment member, which is used for the relative angle between the mounting frame and the bearing bracket, so that the axis of the lamination roller 154 is parallel to the axis of the winding needle 200. Specifically, the adjustment member can be an adjustment screw. The bearing bracket is connected rotatably with the mounting frame at the central position, has two ends each provided with an adjustment member. The levelness of the mounting frame can be adjusted through the two adjustment members, so that the lamination roller 154 and the winding needle 200 are parallel with each other.

In this embodiment, the first driving component may be a driving motor. The output end of the driving motor is connected with a screw rod. The sliding bracket is provided thereon with a threaded hole matching the screw rod. The screw rod can be driven to rotate by the driving of the driving motor, and then drive, through the cooperation with the threaded hole, the sliding bracket to move linearly. Of course, the linear driving component here can also be directly driven by a driving component, such as a cylinder etc., which is not limited here.

The working principle of the cell separator fly-cut mechanism 100 provided in this embodiment is as follows. The winding needle 200 is located at the pre-cutting position, the first driving component drives the sliding bracket to approach the winding needle 200, and at this time, the lamination driving component 152 drives the lamination mounting bracket to approach the winding needle 200, so that the lamination roller 154 is pressed against the winding needle 200. After the lamination roller 154 presses the separator 210, the fly-cut mechanism moves to the point where the rotation track of the cutter 174 is tangent to the separator 210, and the rotary driving component 172 drives the cutter 174 to rotate, and the rotational linear speed of the cutter 174 is consistent with the moving speed of the separator 210. When the cutter 174 rotates to the tangent point with the separator 210, the heating wire that has been energized and heated in advance fuses the separator 210, and after cutting, the cutter 174 continues to rotate back to the original point. At this time, the air blowing block blows air to the head of the upper separator 210, so that the separator 210 is away from the cutter 174 and close to the winding needle 200, so that the upper winding needle 200 starts to wind the cell. After the separator 210 is cut off, the laminating mechanism and the fly-cut mechanism return to the initial positions, and prepare for cutting the separator 210 for the next time.

To sum up, in the cell separator fly-cut mechanism 100 provided in this embodiment, the second driving component is arranged on the first driving component, the lamination component 150 is in transmission connection with the second driving component and can perform a linear reciprocating motion along a preset direction under the driving of the second driving component, to move close to or away from the winding needle 200. The lamination component 150 is used to roll and press the separator 210 on the winding needle 200. The fly-cut component 170 is in transmission connection with the second driving component and can perform the linear reciprocating motion along a preset direction under driving of the second driving component, to move close to or away from the separator 210. The fly-cut component 170 is used to move synchronously with the separator 210 and cut off the separator 210 in the situation of being at the speed same as the speed of the separator 210. In this embodiment, it is realized that no vibration occurs when the separator 210 is being cut. The cutting stability is good. The fly-cut component 170 cuts off the separator 210 in the situation of being at the speed same as that of the separator 210, so that the separator 210 can be cut off without stopping the separator 210, realizing the fly-cut function and quickly cutting off the separator 210, which reduces the cutting time of the separator 210, greatly improves the production efficiency of cells, and improves the production capacity of products.

The above are only embodiments of the present application, but the protection scope of the present application is not limited thereto. Any person skilled in the art, who is familiar with the technical field disclosed by the present application, can easily think of changes or substitutions, all of which should be included within the protection scope of the present application. Therefore, the protection scope of the present application should be based on the protection scope of the claims.

What is claimed is:

1. A cell separator fly-cut mechanism, comprising a first driving component, a second driving component, a lamination component and a fly-cut component, wherein the lamination component is in transmission connection with the first driving component and is configured to perform linear reciprocating motion along a preset direction under driving of the first driving component to move close to or away from a winding needle, the lamination component is configured for rolling and pressing the separator on the winding needle; the fly-cut component is in transmission connection with the second driving component and is configured to perform linear reciprocating motion along the preset direction under driving of the second driving component to move close to or away from the separator, and the fly-cut component comprises a fly-cut connecting frame, a rotary driving component, a rotary shaft and a cutter, the fly-cut connecting frame is in transmission connection with the second driving component, the rotary driving component is arranged on the fly-cut connecting frame, and the rotary shaft is rotatably arranged on the fly-cut connecting frame and is in transmission connection with the rotary driving component for rotating relative to the fly-cut connecting frame under driving of the rotary driving component; the cutter is arranged at a surface of the rotary shaft, wherein the cutter, when being close to the separator, clings to a surface of the winding needle, and at the same time, the separator rotates along with the winding needle, and the cutter is configured for moving in synchronization with the separator under driving of the rotary shaft and cutting off the separator in situation of being at a speed same as a speed of the separator.

2. The cell separator fly-cut mechanism according to claim 1, wherein the lamination component comprises a lamination driving component, a lamination mounting frame and a lamination roller, the lamination mounting frame is in transmission connection to the first driving component, the lamination driving component is arranged on the lamination mounting frame, the lamination roller is rotatably arranged on the lamination mounting frame, the lamination mounting frame is configured to perform linear reciprocating motion under driving of the lamination driving component so as to make the lamination roller move close to or away from the winding needle, and the lamination roller is configured for pressing the separator on the winding needle.

3. The cell separator fly-cut mechanism according to claim 2, wherein the lamination mounting frame comprises a bearing bracket and a mounting frame, the bearing bracket is connected with the lamination driving component, the mounting frame is arranged on a side of the bearing bracket away from the lamination driving component, the lamination roller is rotatably arranged on the mounting frame, the bearing bracket is also provided with at least one adjustment member, and the at least one adjustment member is used for a relative angle between the mounting frame and the bearing bracket, such that an axis of the lamination roller is parallel to an axis of the winding needle.

* * * * *